United States Patent Office 3,749,679
Patented July 31, 1973

3,749,679
CARBOALKOXY SUBSTITUTED BIS-PHENYL OXALATES AS SUPERIOR CHEMILUMINESCENT MATERIALS
Michael McKay Rauhut, Bridgewater, N.J., assignor to American Cyanamid Company, Stamford, Conn.
Continuation-in-part of application Ser. No. 842,134, July 16, 1969. This application Mar. 15, 1971, Ser. No. 124,142
Int. Cl. C09k 3/00
U.S. Cl. 252—188.3                    10 Claims

ABSTRACT OF THE DISCLOSURE

New compounds which are ester substituted bis(aryl) oxalate esters. The compounds are reactive with hydrogen peroxide in the presence of a solvent and a fluorescer to give visible chemiluminescent light.

---

Figure 1:
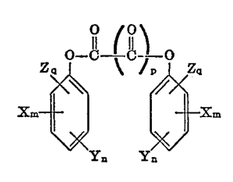

This application is a continuation-in-part of previous application Ser. No. 842,134, filed July 16, 1969, now abandoned.

This invention relates to a chemiluminescent light system using the reaction of an aryl oxalate ester and a peroxide in a diluent in the presence of a fluorescer wherein higher light capacity is obtained by having carbalkoxy substituents on the aryl groups of the oxalate ester.

It has been established by Rauhut et al. J. Am. Chem. Soc., 89, 6515 (1967); M. M. Rauhut et al. "Chemiluminescent Materials" (Final Technical Report to the Office of Naval Research and the Advancement Research Projects Agency) Defense Documentation Center, Cameron Station, Va., AD 653-090 (1967); M. M. Rauhut, "Accounts of Chemical Research," 2, 80 (1969), copending application Ser. No. 619,140, that superior chemical lighting from the reaction of oxalate esters with fluorescers and hydrogen peroxide, in a diluent, requires an oxalate ester with a high order of reactivity toward hydrogen peroxide. The reactivity of an aromatic ester toward displacement of aromatic phenol by a nucleophile such as hydrogen peroxide can be estimated with substantial accuracy with reference to the Hammett sigma constants of the substituent groups on the displaced aromatic phenol. (See Table I for representative Hammett sigma constant values.)

Thus, while all oxalate esters are believed to produce detectable light when reacted with hydrogen peroxide, a fluorescer, and, if desired, a basic catalyst, in a diluent, the production of superior light intensities from an aromatic oxalate ester requires that the aromatic residue be substituted with sufficient electronegative substituents to provide a sigma constant sum of at least about 1.4. The values of Hammett sigma constants for a large number of substituents are available in the literature [see for example, G. B. Barlin and D. D. Perrin, Quart. Re., 20, 75 (1966)]. Thus in general the structures of superior aromatic oxalate esters are readily predictable.

TABLE I.—SIGMA CONSTANTS FOR SUBSTITUENT GROUPS IN PHENOLS [a]

| Group | Otho sigma | Meta sigma | Para sigma |
|---|---|---|---|
| H | 0 | 0 | 0 |
| —OCH$_3$ | 0 | 0.08 | −0.11 |
| —CH$_3$ | −0.13 | −0.07 | −0.17 |
| —CH$_2$CH$_3$ | [b]−0.09 | −0.05 | −0.13 |
| —CH(CH$_3$)$_2$ | −0.23 | −0.07 | −0.15 |
| —C(CH$_3$)$_3$ | −0.52 | −0.10 | −0.20 |
| —CH$_2$OH | 0.04 | 0.08 | 0.08 |
| —F | 0.54 | 0.34 | 0.06 |
| —Cl | 0.68 | 0.37 | 0.23 |
| —Br | 0.70 | 0.39 | 0.27 |
| —NO$_2$ | 1.24 | 0.71 | 1.24 |
| —CF$_3$ | | 0.47 | 0.54 |
| —CN | | 0.61 | 0.88 |
| —C(O)OC$_2$H$_5$ | [b] .45 | 0.37 | 0.45 |

[a] Data from G.B. Barlin and D. D. Perrin, Quart. Rev., 20, 75 (1966).
[b] Estimated.

While H$_2$O$_2$ has been indicated as the reactant, it has been also found that hydroperoxide compounds in general will also be effective (as disclosed in copending, commonly assigned U.S. application Ser. No. 619,140, filed Feb. 28, 1967).

Prior to this invention, however, the light output per unit volume (the light capacity) of oxalate ester chemical lighting systems has been limited by a serious loss of chemiluminescent efficiency (that is, a reduction in quantum yield) as the concentration of oxalate ester increased. The light capacity is a major criterion for the utility of a chemical lighting system in that the light capacity determines the maximum brightness and useful lifetime of light emission. Thus the light capacity (L) (in units of lumen hours liter$^{-1}$) is related to the brightness and lifetime by:

$$L = \int_{T=0}^{T=\infty} IdT/V$$

where:

I is the intensity in lumens,
T is the time in hours, and
V is the volume of the system in liters.
It can be shown that $$L = 4.07 \times Q \times C \times P$$

wherein:

Q is the chemiluminescent quantum yield (in units of einsteins per mole of oxalate ester),
C is the concentration of oxalate ester (in units of moles liter$^{-1}$), and
P is a "photoptic" constant which defines the ability of the human eye to see the color of the emitted light.

It is clear from this equation that high light capacities require high quantum yields (Q) at high oxalate concentrations (C), and it is thus readily seen why earlier oxalate ester chemical lighting systems have been limited in light capacity. Thus, at the high oxalate concentrations required for high light capacity, low quantum yields were obtained so that high light capacities were impossible. Indeed, previous oxalate ester chemical light systems have been limited to optimum oxalate ester concentrations below 0.04 M and light capacities have been limited to below about 125 lumen hours liter$^{-1}$ as in copending, commonly, assigned application Ser. No. 813,973, filed Apr. 7, 1969, now abandoned.

It is therefore an object of this invention to provide a a chemiluminescent system having a higher light output than those heretofore.

A further object is to provide a method for improving the brightness and useful lifetimes of oxalate ester chemiluminescent systems.

These and other objects of the invention will become apparent as the description thereof proceeds.

I have unexpectedly discovered that the introduction of a carbalkoxy substituent into the aromatic portion of an aryl oxalate substantially reduces the loss in quantum yield obtained with increasing oxalate ester concentration and permits the attainment of high light capacities. This reduction in concentration-derived quantum yield loss obtained by carbalkoxy substitutions is limited to substituted phenyl oxalates in which the sum of the Hammett sigma constants of the substituents is less than about 2.7. Thus carbalkoxy phenyl oxalate esters substituted additionally by other electronegative substituents, so that the sum of all the sigma constants of the substituents lies between 1.4 and about 2.7, provide high quantum yields at high oxalate ester concentrations to give light capacities above 150 lumen hours liter$^{-1}$. Since the carbalkoxy substituent, which is essential to this result, has a Hammett sigma constant of about 0.4, the sum of the sigma constants of the additional substituents required for high light capacity must be at least about 1.0.

The general class of compounds may be represented by the formula:

where:

X represents one or more electronegative substituents, i.e., one having a Hammett sigma constant greater than zero, as previously defined,
Y represents a carbalkoxy group,
Z represents a hydrogen, alkyl or alkoxyalkyl group,
$m$, $n$ and $q$ are integers such that the combined Hammett sigma constant of the X, Y and Z substituents on each phenyl group is at least about 1.4 to 2.7. In the above, each of $m$ and $n$ is always at least one, $q$ is 0, 1, 2 or 3 and
$p$ is an integer at least one.
Xm may represent several different electronegative substituents. Moreover, the aryl oxalate may be additionally substituted by such non-electronegative substituents as alkyl and para-alkoxy, provided only that the sigma sum of all the substitutents is at least about 1.4 to 2.7.

The preparation of carbalkoxy phenyl derivatives of bis(phenyl)oxalate esters is illustrated by the two reactions below. The synthesis in many cases is conveniently begun by reaction of a carboxyphenol with a reagent such as $Cl_2$, $Br_2$, or $HNO_3$, to introduce the electronegative substituent. The conditions required for electronegative substitution depend on the particular carboxyphenol and the reagent. Thus two conditions for chlorination, "Method 1" for introduction of chlorine meta to the phenolic OH and "Method 2" for introduction of chlorine ortho and para to OH are shown. These reactions in general are well known.

2-Hydroxy-3,5,6-trichlorobenzoic acid (known).

Bis(2,4,5-trichloro-6-carbobutoxyphenyl)oxalate (TCCPO) (new).

Method 2

3,5-dicarboxphenol

Bis)3,5-dicarbobutoxy, 2,4,6-trichlorophenyl)oxalate.

Representative carbalkoxyphenyloxalate esters capable of high light capacity are illustrated in Table II.

TABLE II.—REPRESENTATIVE OXALATE ESTERS CAPABLE OF SUPERIOR LIGHT CAPACITIES

| Sum of sigma constants for substituent groups (excluding one carbalkoxy group). | $$P-O-\overset{O}{\overset{\|}{C}}-\overset{O}{\overset{\|}{C}}-O-P$$ (where P—O— is as follows:) | Chlorination method |
|---|---|---|
| 1.28 | | (1) Bis(2-carbalkoxy-3,4,6-trichlorophenyl)oxalate. |
| 1.59 | | (2) Bis(3-carbalkoxy-2,4,6-trichlorophenyl)oxalate. |
| 1.73 | | (1) Bis(4-carbalkoxy-2,3,6-trichlorophenyl)oxalate. |
| 1.96 | | (2) Bis(3,5-dicarbalkoxy-2,4,6-trichlorophenyl)oxalate. |
| 1.65 | | (1) Bis(2,3-dicarbalkoxy-4,5,6-trichlorophenyl)oxalate. |
| 1.87 | | (2) Bis(2,4-dicarbalkoxy-3,5,6-trichlorophenyl)oxalate. |
| 1.73 | | (1) Bis(2,5-dicarbalkoxy-3,4,6-trichlorophenyl)oxalate. |
| 1.42 | | (1) Bis(2,6-dicarbalkoxy-3,4,5-trichlorophenyl)oxalate. |
| 1.96 | | (1) Bis(3-carbalkoxy-2,4,5,6-tetrachlorophenyl)oxalate. |

TABLE II—Continued

| Sum of sigma constants for substituent groups (excluding one carbalkoxy group). | P—O—C—C—O—P (where P—O— is as follows:) with two C=O | Chlorination method | |
|---|---|---|---|
| 1.65 | [structure: phenyl with O— at position 1, Cl at 3,4,5, COR at 2] | (1) | Bis(2-carbalkoxy-3,4,5,6-tetrachlorophenyl)oxalate. |
| 2.10 | [structure: phenyl with O— at position 1, Cl at 2,3,5,6, COR at 4] | (1) | Bis(4-carbalkoxy-2,3,5,6-tetrachlorophenyl)oxalate. |
| 1.28 | [structure: phenyl with O— at position 1, Cl at 3,4,6, COR at 2] | (1) | Bis(6-carbalkoxy-2,3,4-trichlorophenyl)oxalate. |
| 1.28 | [structure: phenyl with O—, Cl at 4,6, COR at 2 and 3] | (2) | Bis(2,3-dicarbalkoxy-4,6-dichlorophenyl)oxalate. |
| 1.28 | [structure: phenyl with O—, Cl at 2,4, COR at 3 and 6] | (2) | Bis(3,6-dicarbalkoxy-2,4-dichlorophenyl)oxalate. |
| 1.65 | [structure: phenyl with O—, Cl at 4,6, COR at 2,3,5] | (2) | Bis(2,3,5-tricarbalkoxy-4,6-dichlorophenyl)oxalate. |
| 2.08 | [structure: phenyl with O—, Cl at 2,6, COR at 3,4,5] | (2) | Bis(3,4,5-tricarbalkoxy-2,6-dichlorophenyl)oxalate. |
| 1.64 | [structure: phenyl with O—, Cl at 3,5, COR at 2,4,6] | (1) | Bis(2,4,6-tricarbalkoxy-3,5-dichlorophenyl)oxalate. |
| 1.07 | [structure: phenyl with O—, Cl at 3, Br at 5, Cl at 6, COC$_6$H$_{13}$ at 2] | (1) | Bis(3-bromo-6-carbohexoxy-2,4,5-trichlorophenyl)oxalate. |

TABLE II—Continued

| Sum of sigma constants for substituent groups (excluding one carbalkoxy group). | P—O—C(=O)—C(=O)—O—P (where P—O— is as follows:) | Chlorination method | |
|---|---|---|---|
| 1.30 |  | (1) | Bis(3-bromo-2-carbethoxy-4,6-dichlorophenyl)oxalate. |
| 1.62 |  | (2) | Bis(2-carbethoxy-4,6-dichloro-3-nitrophenyl)oxalate. |
| 1.38 |  | (2) | Bis[2-carbomethoxy-4,6-dichloro-3-(trifluoromethyl)phenyl]oxalate. |
| 1.52 |  | (2) | Bis(2-carbobutoxy-4,6-dichloro-3-cyanophenyl)oxalate. |
| 1.36 |  | (3) | Bis(2-carboctyloxy-4,5,6-trichloro-3-ethoxyphenyl)oxalate. |
| 1.36 |  | (3) | Bis(2-carbobutoxy-3,4,6-trichloro-5-ethoxyphenyl)oxalate. |
| 1.21 |  | (1) | Bis(2-carbisopropoxy-3,4,6-trichloro-5-methylphenyl)oxalate. |
| 1.57 |  | (2) | Bis(2-carbisopropoxy-4,6-dichloro-5-octylphenyl)oxalate. |
| 1.29 |  | (2) | Bis[2-carbomethoxy-3,5,6-trichloro-4-(1,1,3,3-tetramethylbutyl)phenyl]oxalate. |

TABLE II—Continued

| Sum of sigma constants for substituent groups (excluding one carbalkoxy group). | P—O—C—C—O—P (where P—O— is as follows:) | Chlorination method | |
|---|---|---|---|
| 1.28 | ![structure with F,F,F and —COCH(CF₃)₂] | | Bis{2-[carbobis(trifluoromethyl)methoxy]-3,4,5,6-tetrafluorophenyl}oxalate. |
| 1.36 |  with Br,Br,Br and —COC₆H₁₁ | (1) | Bis(3,4,6-tribromo-2-carbocyclohexoxyphenyl)-oxalate. |
| 1.29 |  with Br,Br,C₁₆H₃₃ and —COC₆H₅ | (1) | Bis(2,4,5-tribromo-6-carbophenoxy-3-hexadecylphenyl)-oxalate. |

There are a number of variables which influence the chemiluminescent reaction and the amount of light output, light intensity and time of illumination. These are listed as follows:

(1) Oxalate structure,
(2) Oxalate concentration,
(3) Fluorescer structure,
(4) Fluorescer concentration,
(5) Catalyst structure,
(6) Catalyst concentration,
(7) $H_2O_2$ concentration,
(8) Distribution of reactants into components,
(9) Selection of solvents for components, and
(10) Reaction temperature.

The effect of these variables on the reaction is discussed in subsequent paragraphs.

In addition to the reaction variables, there are also certain practical criteria for utilization of the chemiluminescent reaction in a lighting system. These criteria are:

(1) Brightness,
(2) Lifetime,
(3) Storage stability of components, and
(4) Odor, toxicity, flash point, and containment in plastic containers.

These practical criteria will be further discussed later.

(1) OXALATE STRUCTURE

The oxalate ester of this invention is a bis(phenyl) oxalate ester having the formula:

$$P-O-\overset{O}{\underset{\|}{C}}-\overset{O}{\underset{\|}{C}}-O-P$$

in which the phenyl groups (P) are substituted by (1) at least one carbalkoxy group of the formula $$-\overset{O}{\underset{\|}{C}}OR$$

in which R is (a) an alkyl group (1 to 18 carbons, straight chain, branched chain, cyclic) or (b) a substituted alkyl group, where said substituents are selected from the group comprising fluoro, chloro, trifluoromethyl, alkoxy, cyano, carbalkoxy, and phenyl; and in which (2) the phenyl groups, P, are substituted by at least two additional substituents selected from the group comprising fluoro, chloro, bromo, cyano, trifluoromethyl, carbalkoxy, nitro, alkoxy, alkoxy methyl, methyl, and higher alkyl, said additional substituents being selected so that the sum of their Hammett sigma constants for phenols lies between about 1.0 and 2.3.

The preferred subclass has the carbalkoxy substituent ortho to the phenolic oxygen.

The preferred species is bis(2,4,5-trichloro-6-carbobutoxyphenyl)oxalate.

(2) OXALATE CONCENTRATION

The oxalate concentration in the reacting system may vary widely from 0.01 M to 1.5 M. Preferably, the concentration is 0.03 M to 0.3 M.

(3) FLUORESCER STRUCTURE

The fluorescent compounds contemplated herein are numerous; and they may be defined broadly as those which do not readily react on contact with the peroxide employed in this invention, such as hydrogen peroxide; likewise, they do not readily react on contact with the ester of oxalic acid. Typical suitable fluorescent compounds for use in the present invention are those which have a spectral emission falling between 330 millimicrons and 1200 millimicrons and which are at least partially soluble in any of the above diluents, if such diluent is employed. Among these are the conjugated polycyclic aromatic compounds having at least 3 fused rings, such as: anthracene, substituted anthracene, benzanthracene, phenanthrene, substituted phenanthrene, naphthacene, substituted naphthacene, pentacene, substituted pentacene, perylene, substituted perylene, and the like.

Typical of the substituents for all of these are phenyl, lower alkyl, chlorine, bromine, cyano, alkoxy ($C_1$–$C_{16}$), and other like substituents which do not interfere with the light-generating reaction contemplated herein.

Numerous other fluorescent compounds having the properties given hereinabove are well known in the art. Many of these are fully described in "Fluorescence and Phosphorescence," by Peter Pringsheim, Interscience Publishers, Inc., New York, N.Y., 1969. Other fluorescers are described in "The Colour Index," second edition, volume 2, The American Association of Textile Chemists and Colorists, 1956, pp. 2907–2923. While only typical fluorescent compounds are listed hereinabove, the person skilled in the art is fully aware of the fact that this invention is not so restricted, and that numerous other fluorescent compounds having similar properties are contemplated for use herein.

The preferred fluorescers are 9,10-bis(phenylethynyl)-anthracene, 1-methoxy - 9,10 - bis(phenylethynyl)anthracene, 9,10-diphenylanthracene, perylene.

(4) FLUORESCER CONCENTRATION

The fluorescer concentration in the reacting system is broadly 0.0002 to 0.03, preferably 0.001 to 0.005.

(5) CATALYST STRUCTURES

Catalyst structures include broadly those disclosed in copending application Ser. No. 813,862, filed Apr. 7, 1969, which are basic catalysts including amines, hydroxide, alkoxide, carboxylic acid salts and phenolic salts. Preferred are salts of carboxylic acids and phenols whose conjugate acids have pKa values between 1 and 6 as measured in aqueous solution.

Some preferred examples of catalysts are sodium salicylate, tetrabutylammonium salicylate, potassium salicylate, tetrahexylammonium benzoate, benzyltrimethylammonium m-chlorobenzoate. Other catalysts may be dimagnesium ethylenediamine tetraacetate, tetraethyl ammonium stearate, calcium stearate, magnesium stearate, calcium hydroxide, magnesium hydroxide, lithium stearate, triethyl amine, pyridine, piperidine, imidazole, triethylene diamine, and potassium trichlorophenoxide.

(6) CATALYST CONCENTRATION

The optimum catalyst concentration in the reacting system depends on catalyst structure but, in general, is broadly zero to 0.1 M, preferably zero to 0.01 M.

(7) $H_2O_2$ CONCENTRATION

The $H_2O_2$ concentration in the reacting system is broadly 0.01 M to 10 M. Preferably, the $H_2O_2$ concentration is from equal to the oxalate concentration to four times the oxalate concentration.

(8) COMPONENT FORMULATION

The order of combining the reactants for obtaining chemiluminescent light is not critical. A reaction and chemiluminescent light could be obtained by combining all necessary materials in the suitable solvent simultaneously or in any order. However, for a practical lighting system or device, the reactants may be formulated as combinations in separate components in such a way that a reaction and a chemiluminescent light do not occur until the separate components are combined. Thus the brightness and lifetime recorded in the tables can be obtained by:

(1) Mixing separate solutions of each individual reactants in any order, providing there is no undue delay, (2) Combining the oxalate and fluorescer in a solvent as an "oxalate" component, combining the $H_2O_2$ and catalyst in a solvent as a "peroxide component," and combining the two components or (3) Combining the oxalate component of (2) with $H_2O_2$ (either dissolved in a solvent or as a pure liquid) and with a catalyst (either dissolved in a solvent or a pure liquid or solid).

Satisfactory performance can also be obtained by putting the oxalate and fluorescer in solution or as solids on a substrate and activating with a solution of $H_2O_2$ and a catalyst (as disclosed in copending, commonly assigned U.S. application Ser. No. 741,517, filed July 1, 1968). Also the oxalate, fluorescer and catalyst may be combined as solids and the combination either alone or in a substrate can be activated by treating with $H_2O_2$ in a solvent such as dimethylphthalate.

(9) SOLVENTS

Solvents for the chemiluminescent components are organic solvents of a number of types, set forth as follows.

(1) Oxalate components in solution:

(a) Broadly, esters such as ethyl acetate, ethyl benzoate, dimethyl phthalate, dibutyl phthalate, dioctyl phthalate, methyl formate, triacetin, diethyl oxalate, and dioctyl terphthalate.

(b) Aromatic hydrocarbons such as benzene, toluene, ethyl benzene, butylbenzene;

(c) Chlorinated hydrocarbons such as chlorobenzene, o-dichlorobenzene, m-dichlorobenzene, chloroform, carbon tetrachloride, hexachloroethane, tetrachlorotetrafluoropropane.

Of the solvents, the preferred are ethyl benzoate, dibutyl phthalate, and dimethyl phthalate.

(2) Peroxide component containing bases:

Broadly, primary, secondary, and tertiary alcohols such as ethyl, hexyl, 2-ethylhexyl, 2-octanol, cyclohexyl, pinicol, glycerol, 1,3-propylene glycol, tertiary butanol and 3-methyl-3-pentanol are used.

The tertiary alcohols such as t-butyl, 3-methyl-3-pentanol, and 3,6-dimethyl-3-octanol are preferred.

(3) Peroxide components without catalyst for a 2-component uncatalyzed system for a 3-component system (fluorescer+oxalate)+catalyst+hydrogen peroxide or for systems in which a solid oxalate, a solid fluorescer, and a solid catalyst are combined as a component.

Broadly all of the above alcohols and esters in 9(1) above may be used. It is preferred to use dimethylphthalate or tertiary alcohols.

(10) REACTION TEMPERATURE

Light intensities increase and lifetimes decrease with increasing temperature. However, temperature is not critical to the emission of light above about $-40°$ C. The oxalates of this invention are superior to any previously known oxalates at all temperatures. The preferred range of operation is about $-30°$ F. to $+150°$ F.

The particular advantages of bis(2,4,5-trichloro-6-carbobutoxyphenyl)oxalate (TCCPO) and bis(2,4,5-trichloro-6-carbopentoxy)oxalate (CPPO), which are the preferred phenyl oxalates of this invention, include:

(1) Higher light capacities (200–450 lumen hour $1^{-1}$ with TCCPO, compared to 60–130 lumen hour $1^{-1}$ with bis(2,4,6 - trichlorophenyl)oxalate (TCPO), a typical, previously known oxalate).

(2) Higher brightness in short-lived systems (150-foot lamberts cm.$^{-1}$ with TCCPO, versus 19-foot lamberts cm.$^{-1}$ with TCPO).

(3) Longer-lived low light intensity system (12 hours above 0.15-foot lamberts cm.$^{-1}$ with TCCPO, versus 6 hours with TCPO).

(4) Improved physical properties of systems. For example, TCCPO is sufficiently soluble in dibutyl phthalate (0.07 M) to permit the use of this low odor, low cost, low toxicity, high flash point solvent as a major component of practical chemical lighting systems, whereas TCPO is too insoluble in dibutyl phthalate (<0.01 M) to permit sufficient light capacity for use. These advantages will be especially useful for applications requiring spray or aerosol applications.

(5) Improved low-temperature performance resulting from increased solubility in low-freezing point solvents: TCCPO is soluble to the extent of 0.25 M in ethyl benzoate (TCPO is soluble to 0.05 M) and to the extent of 0.5 M in o-dichlorobenzene (TCPO is soluble to 0.08 M) at room temperature. Since these relative solubilities are approximately maintained in the same order at temperatures of $-40°$ F. to $50°$ F., TCCPO systems are more useful at lower temperatures than are TCPO systems.

The following specific examples are set forth to illustrate the invention, but are not intended to be limitative.

In the examples quantitative chemiluminescence experiments were carried out in a 1-cm. deep, 3-ml. cylindrical quartz cuvette, positioned vertically at the entrance of a previously described calibrated spectroradiometerfluorimeter.[1] The rear surface of the cuvette was blackened to

---

[1] B. G. Roberts and R. C. Hirt, Applied Spectroscopy, 21, 250 (1967).

minimize reflection, and a magnetic stirrer was positioned vertically behind the cuvette to provide rapid mixing. Aliquotes of standardized stock solutions of oxalate ester, hydrogen peroxide, fluorescer, catalyst, and solvent as required were combined in the cuvette using all-glass syringes. Separate stock solutions of individual reactants were generally used, but in some experiments the oxalate ester and fluorescer were combined in a single stock solution or the hydrogen peroxide and catalyst were combined in a single stock solution. No difference between these procedures was observed. In most experiments a solvent mixture containing an alcohol was used, and the alcohol component of the mixture was used only for stock solutions of hydrogen peroxide and catalyst, since oxalate esters react slowly with alcohols, and fluorescers tend to be poorly soluble. The order of reactant addition was not critical, although hydrogen peroxide and catalyst in that order were generally added last. Rapid mixing was obtained, and the mixing rate was not critical at the rapid stirrer speeds used. The experiments were not thermostated, but the ambient conditions maintained reaction temperatures at $25°$ C.$\pm 1°$ C.

The intensity of a 5 m$\mu$ spectral segment located near the spectral maxima was recorded as a function of time using a United Systems Corporation Digitec recorder. Spectra were obtained as previously described[1] and were corrected for intensity decay with time during the spectral determination. The raw spectral and intensity decay data were processed as previously described[2] by a Scientific Data 930 Computer programmed with the calibration data to obtain corrected spectra, absolute spectrally-integrated intensities as a function of time, and quantum yields.

[2] M. M. Rauhut, B. G. Roberts, and A. M. Semsel, J. Am. Chem. Soc., 88, 3604 (1966).

EXAMPLE I

Oxalate structure correlation

Chemiluminescence from several oxalate esters is compared under approximately constant reaction conditions in Table III. The oxalates were selected to indicate the effect of a carbalkoxy substituent and also to indicate the effect of electronegative substitution on chemiluminescent light capacity. It is seen from Table III that TCCPO and BrTCCPO, which contain carbalkoxy substituent and which have sigma constant sums (including the carbalkoxy substituent) between about 1.4 and 2.7 provide substantially higher light capacities than the other oxalates. Thus TCPO and BTCO both have sigma sums between 1.4 and 2.7 but lack the carbalkoxy substituent and provide relatively lower light capacities. DCCEPO and DCPO both contain the required carbalkoxy substituent but have sigma sums below 1.4 and thus also provide relatively low light capacities. DNCBPO has a sigma sum above 2.7 and therefore has a relatively low light capacity. The experiments in Table III do not represent optimized conditions for chemiluminescence for the various oxalates but nevertheless demonstrate structural criteria for high light capacity.

EXAMPLE II

The experiments in Table IV indicate that relatively low light capacities are obtained under several sets of reaction conditions with the oxalate bis(2,4-dichloro-6-carbethoxyphenyl)oxalate (DCCEPO).

EXAMPLE III

The effect of oxalate concentration on quantum yield and light capacity in chemiluminescent experiments with bis(3 - butoxy-2,4,6-trichlorophenyl)oxalate (BTCO) is shown in Table V.

High quantum yields are obtained at low oxalate

TABLE III

[Comparison of oxalate ester chemiluminescent reactions in ethyl benzoate (EB)—3-methyl-3-pentanol (MP) solution [e]]

| Oxalate[b] | Sum of sigma constant[c] | Solvents, percent | Co-solvent, percent | Catalyst[c] | System concentrations | | | | Lf. Tm. (min.) | Quantum yield, $10^2$ eins. mole$^{-1}$ | Light capacity, lum. Hrs. liter$^{-1}$ | Intensity (ft. lbts. cm.$^{-1}$) vs. time | | | | |
|---|---|---|---|---|---|---|---|---|---|---|---|---|---|---|---|---|
| | | | | | Oxalate (M) | $H_2O_2$ (M) | BPEA ($10^3$ M) | Catalyst ($10^4$ M) | | | | 2 min. | 10 min. | 30 min. | 60 min. | 120 min |
| TCCPO | 1.73 | EB, 75 | MP, 25 | NaSal | 0.10 | 0.375 | 2.3 | 37.5 | 15 | 6.04 | 180 | 80 | 41 | 6.4 | | |
| BrTCBPO | 2.12 | EB, 75 | MP, 25 | None | 0.094 | 0.375 | 3.0 | | 125 | 5.8 | 167 | 1.0 | 6.2 | 9.4 | 6.4 | 2.8 |
| DNCBPO | 2.93 | DMP, 100 | | TBAS | 0.075 | 0.188 | 2.0 | 5.0 | 121 | 1.5 | 34 | | | | | |
| TCPO | 1.59 | EB, 75 | MP, 25 | NaSal | 0.030 | 0.075 | 3.0 | 12.5 | 39 | 7.8 | 72 | 14 | 8.9 | 6.9 | 2.2 | |
| TCPO[d] | 1.59 | EB, 75 | MP, 25 | NaSal | 0.060 | 0.150 | 2.0 | 15.0 | 94 | 1.2 | 22 | | | | | |
| BTCO | 1.67 | EB, 75 | MP, 25 | NaSal | 0.10 | 0.375 | 2.7 | 25.0 | 74 | 1.3 | 42 | 2.5 | 5.1 | 3.1 | 1.7 | 0.2 |
| DCCEPO | 1.36 | EB, 75 | MP, 25 | NaSal | 0.10 | 0.375 | 3.0 | 25.0 | 77 | 2.04 | 62 | 7.6 | 5.7 | 3.8 | 2.2 | |
| DCCPO | 1.28 | EB, 75 | MP, 25 | NaSal | 0.10 | 0.375 | 3.0 | 25.0 | 45 | 1.0 | 31 | 4.2 | 4.8 | 2.1 | 0.9 | 0.2 |

[a] Reactions at 25° C.
[b] TCCPO is bis(2,4,5-trichloro-6-carbobutoxyphenyl)oxalate; DNCBPO is bis(2,4-dinitro-6-carbobutoxyphenyl)oxalate; TCPO is bis(2,4,5-trichlorophenyl(oxalate); DCCEPO is bis(2,4-dichloro-6-carbethoxyphenyl)oxalate; DCCPO is bis(2,4-dichloro-3-carbobutoxyphenyl(oxalate); BTCO is bis-(3-butoxy-2,4,6-trichlorophenyl)oxalate.
[c] NaSal is sodium salicylate; TBAS is tetrabutylammonium salicylate.
[d] Insoluble TCPO present initially.
[e] Estimated.
[f] EB is ethylbenzoate; DMP is dimethyl phthalate; MP is 3-methyl-3-pentanol.

TABLE IV

[Chemiluminescent reactions with bis(2,4-dichloro-6-carbethoxyphenyl)oxalate (DCCEPO) [a]]

| NaSal (M) | Intensity ft. lbts. cm$^{-1}$ at— | | | | | Lf. Tm.[b] $t_{3/4}$ mins.) | Quantum yield ($10^2$ ein. mole$^{-1}$) | Light capacity (lum. hrs. liter$^{-1}$) |
|---|---|---|---|---|---|---|---|---|
| | 2 mins. | 5 mins. | 10 mins. | 30 mins. | 60 mins. | | | |
| 2.5×10$^{-3}$ | 7.6 | 6.8 | 5.7 | 3.8 | 2.2 | 77.1 | 2.04 | 62.3 |
| 3.75×10$^{-3}$ | 14.3 | 8.1 | 6.7 | 3.4 | 1.5 | 57.5 | 1.74 | 53.1 |
| 6.125×10$^{-3}$ | 10.6 | 7.8 | 5.7 | 2.1 | 0.6 | 27.8 | 1.11 | 33.9 |

[a] Reactions of 0.10 M DCCEPO with 0.375 M $H_2O_2$, 3.0×10$^{-3}$ M BPEA and sodium salicylate (NaSal) in .75% ethyl benzoate—25% 3-methyl-3-pentanol.
[b] Time required for three-quarters- of total light emission.

Set A.—Comparison of highest light capacity systems, and also comparison of systems using TBAS catalysis.
Set B.—Comparison of systems brightest at 10 mins., and also comparison of systems using sodium salicylate.
Set C.—Comparison of systems brightest at 6.5 hours.
Set D.—Comparison of systems at −20° C.

TCCPO and TCPO are compared graphically in the figure.

EXAMPLE V

Chemiluminescence from bis(2,4,5-trichloro-6-carbopentoxyphenyl)oxalate (CPPO) and from bis(2,4,5-trichloro-6-carbopentoxyphenyl)oxalate are compared under the same reaction conditions in Table VII. Very similar brightness and light capacity results are obtained for the two compounds. CPPO, however, is substantially more soluble in dibutyl phthalate (solubility above 0.26 M at 25° C.) than TCCPO (solubility about 0.07 M at 25° C.). Thus while stable solutions of CPPO can be obtained at 0.26 M concentration, solutions of TCCPO at concentrations above 0.07 M are supersaturated at 25° C. and TCCPO gradually precipitates. Thus CPPO is preferred relative to TCCPO in terms of solubility.

TABLE V

[Chemiluminescence of bis(3-butoxy-2,4,6-trichlorophenyl)oxalate in 75% ethyl benzoate and 3-methyl-3-pentanol [a]]

| BTCO (M) | BPEA (10³ M) | Catalyst (10² M) NaSal | Catalyst (10² M) EtₐN | H₂O₂ (M) | Rise time[b] (mins.) | Intensity (ft. lbts. cm.⁻¹) at — 0 mins. | 2 mins. | 5 mins. | 10 mins. | 30 mins. | 60 mins. | 180 mins. | Lt. Tm.[c] (min.) | Quantum yield[d] (10⁻² eins. mole⁻¹) | Light capacity[e] (lum. hr liter⁻¹) |
|---|---|---|---|---|---|---|---|---|---|---|---|---|---|---|---|
| 0.01 | 3.0 | ---- | 0.10 | 0.025 | 0 | 7.78 | 6.18 | 5.32 | 3.98 | 1.83 | 0.89 | ---- | 51.11 | 9.04 | 27.96 |
| 0.10 | 2.7 | 0.25 | ---- | 0.375 | 8 | ([f]) | 2.45 | 4.22 | 5.14 | 3.12 | 1.68 | 0.19 | 74.45 | 1.34 | 41.60 |
| 0.10 | 3.0 | ---- | 1.0 | 0.25 | 0 | 14.15 | 10.15 | 9.30 | 6.71 | 2.55 | 0.90 | ---- | 40.34 | 1.30 | 40.10 |

[a] Experiments at 25° C.; BPEA is 9,10-bis(phenylethynyl)anthracene; NaSal is sodium salicylate; and Et₃N is triethylamine.
[b] Time required for intensity to reach its maximum.
[c] Time required for emission of 75% of the total light.
[d] Quantum yield based on the initial BTCO concentration.
[e] Integrated light output per unit volume.
[f] Intensity less than one ft. lambert.

EXAMPLE IV

In this example, TCCPO was compared to TCPO under conditions most favorable to each compound. The conditions are listed below, and the results are shown in Table VI.

concentrations as would be expected from the sum of the sigma constants of the phenyl substituents (1.67). However, at high concentrations, the quantum yield is reduced so that low light capacities are obtained. This behavior is typical of all presently known oxalates which do not contain the carbalkoxy substituent of this invention.

TABLE VI

[Comparison of bis(2,4,5-trichloro-6-carbobutoxyphenyl)oxalate (TCCPO) with bis(2,4,6-trichlorophenyl)oxalate (TCPO) in chemiluminescent reactions under conditions found most suitable for each[a]]

| Set | Oxalate | Solvent,[b] percent | Co-solvent,[b] percent | Catalyst[c] | System concentrations Oxalate (M) | H₂O₂ (M) | BPEA[d] (10² M) | Catalyst (10² M) | Lt. Tm.[e] (min.) | Quantum yield (10⁻² eins. mole⁻¹) | Light capacity (Lumen hours liter⁻¹) | Intensity (ft. lbts. cm⁻¹) 2 mins. | 10 mins. | 30 mins. | 60 mins. | 120 mins. | 180 mins. | 400 mins. |
|---|---|---|---|---|---|---|---|---|---|---|---|---|---|---|---|---|---|---|
| A | TCCPO | DBP, 75 | MP, 25 | TBAS | 0.10 | 0.25 | 2.8 | 1.25 | 126 | 15.2 | 452 | 48 | 26 | 18 | 15 | 8.0 | 4.0 | 0.5 |
| A | TCPO | EB, 75 | MP, 25 | TBAS | 0.030 | 0.075 | 3.0 | 1.00 | 106 | 14.4 | 134 | 22 | 12 | 6.5 | 4.1 | 2.2 | ---- | ---- |
| B | TCCPO | EB, 75 | MP, 25 | NaSal | 0.10 | 0.375 | 2.3 | 37.5 | 15 | 6.04 | 180 | 80 | 41 | 6.4 | 2.2 | ---- | ---- | ---- |
| B | TCPO | EB, 75 | MP, 25 | NaSal | 0.030 | 0.075 | 3.0 | 12.5 | 89 | 7.8 | 72 | 14 | 8.9 | 6.9 | ---- | ---- | ---- | ---- |
| B | TCCPO[g] | EB, 75 | MP, 25 | NaSal | 0.060 | 0.150 | 2.0 | 15.0 | 94 | 1.2 | 22 | ---- | ---- | ---- | ---- | ---- | ---- | ---- |
| C | TCCPO | DBP, 75 | MP, 25 | TBAS | 0.10 | 0.25 | 2.8 | 1.25 | 126 | 15.2 | 452 | 48 | 26 | 18 | 15 | 8.0 | 4.0 | 0.5 |
| C | TCPO | EB, 75 | MP, 25 | None | 0.030 | 0.075 | 3.0 | ---- | 158 | 11.2 | 104 | 8.4 | 7.8 | 4.8 | 2.9 | 1.6 | 0.9 | 0.3 |
| D[f] | TCCPO | EB, 75 | MP, 25 | NaSal | 0.10 | 0.375 | 3.2 | 37.5 | 580 | >2.5 | >76.3 | 7.5 | 2.8 | 1.5 | 1.1 | 0.9 | 0.6 | ---- |
| D[f] | TCPO | DCB, 75 | MP, 25 | TBAS | 0.03 | 0.30 | 2.0 | 3.75 | ---- | ---- | ---- | 0.5 | 0.2 | ---- | ---- | ---- | ---- | ---- |

[a] Reactions at 25° C., except note (f).
[b] DBP: Dibutylphthalate; EB: ethyl benzoate; DCB: 80% o-dichlorobenzene and 20% 1,1,1,3-tetrachloro-2,2,3,3-tetrafluoropropane.
[c] TBAS: Tetrabutylammonium salicylate; NaSal: Sodium salicylate.
[d] BPEA: 9,10-bis(phenylethynyl)anthracene.
[e] Time required for emission of three-quarters of total light.
[f] Reactions at −20° C.
[g] Insoluble TCPO present initially.

TABLE VII

[Comparison of TCCPO and CPPO in dibutyl phthalate solution [a]]

| TCCPO (M) | CPPO (M) | Intensity (foot lamberts cm.$^{-1}$) | | | | | | Lf. Tm.[b] (t$_{3/4}$ min.) | Quantum yield (10$^2$ ein. mole$^{-1}$) | Light capacity (lumen hours liter$^{-1}$) |
|---|---|---|---|---|---|---|---|---|---|---|
| | | 2 min. | 10 min | 30 min. | 60 min. | 120 min. | 180 min. | | | |
| 0.1 | | 75.6 | 38.1 | 16.3 | 9.2 | 2.9 | 0.4 | 54.6 | 10.29 | 305.7 |
| | 0.1 | 47.9 | 30.3 | 15.5 | 8.6 | 3.9 | 2.1 | 98.1 | 10.40 | 317.4 |

[a] All experiments were run at 25° C. and contained 0.1 M of the ester indicated, 2.25×10$^{-3}$ M 9,10-bis(phenylethynyl)anthracene 0.375 M H$_2$O$_2$, 1.25×10$^{-4}$ M sodium salicylate in a solvent mixture at 75% dibutyl phthalate and 25% 3-methyl-3-pentanol. TPPO is bis (2,4,5-trichloro-6-carbopentoxyphenyl)oxalate. TCCPO is bis (2,4,5-trichloro-6-carbobutoxyphenyl)oxalate.
[b] Time required for emmission of ¾ of the total light.

EXAMPLE VI

Chemiluminescent reactions with bis(2,4-dichloro-3,5-dicarbobutoxyphenyl)oxalate (DCDCPO) are summarized in Table VIII. It is clear that under suitable reaction conditions light capacities at least as high as 135 lumen hours liter$^{-1}$ can be obtained.

EXAMPLE VII

In this example the effects of several solvents and catalysts on the TCCPO chemiluminescent reaction were compared. The results are shown in Table IX.

EXAMPLE VIII

Chemiluminescence from TCCPO reactions in several solvent mixtures is compared in Table X. High light capacities were obtained in four ester-type solvents, but superior light capacities were obtained in dibutyl phthalate and methyl benzoate.

EXAMPLE IX

The effect of varying the concentration of the catalyst tetrabutylammonium salicylate (TBAS) on the TCCPO chemiluminescent reaction in a solvent mixture of dibutylphthalate and 3-methyl-3-pentanol is illustrated in this example. The results are shown in Table XI.

EXAMPLE X

The effect of the catalyst tetrabutylammonium 3,5,6-trichlorosalicylate (TBATCS) on chemiluminescence from TCCPO is illustrated in Table XII. It is seen that the effect of TBATCS on the brightness and lifetime of the reaction is very similar to the effect of tetrabutylammonium salicylate (TBAS). It is also evident that small concentrations of the strong acid, 3,5,6-trichlorosalicylic acid, substantially reduce the brightness, but usefully extend the lifetime of the reaction.

TABLE VIII

[Chemiluminescence from bis(2,4-dichloro3-,5-dicarbobutoxyphenyl)oxalate (DCDCPO) [a]]

| DCDCPO (M) | NaSal (10$^4$ M) | DBP percent | EB percent | MP percent | Intensity (ft. lamberts cm.$^{-1}$) vs. time | | | | | Lf. Tm.[b] (t$_{3/4}$ mins.) | Quantum yield [c] (10$^2$ eins. mole$^{-1}$) | Light capacity [d] (lumen hours liter$^{-1}$) |
|---|---|---|---|---|---|---|---|---|---|---|---|---|
| | | | | | 2 mins. | 10 mins. | 30 mins. | 60 mins. | 120 mins. | | | |
| .01 | 1.25 | 75 | | 25 | 7.0 | 2.7 | 1.9 | 1.4 | 0.8 | 150.0 | 15.17 | 46.3 |
| 0.1 | 1.25 | 75 | | 25 | | | Low Intensity | | | | | |
| 0.1 | 25 | 75 | | 25 | 40.5 | 16.7 | 6.7 | 2.8 | 1.1 | 50.3 | 4.42 | 135.0 |
| 0.1 | 2.5 | | 75 | 25 | 1.4 | 1.9 | 2.5 | 2.2 | 1.2 | 112.5 | 1.56 | 47.0 |
| 0.1 | 25 | | 75 | 25 | 20.4 | 10.7 | 4.7 | 1.9 | 0.7 | 48.2 | 2.57 | 77.3 |

[a] Reaction of .00225 M 9,10-bis(phenylethynyl)anthracene, 0.375 M hydrogen peroxide, and the listed sodium salicylate (NaSal) and DCDCPO concentration in the corresponding solvent mixture at 25° C. DBP is dibutyl phthalate; EB is ethyl benzoate.
[b] Time required for the emission of 75% of the total light.
[c] Quantum yield based on the initial DCDCPO concentration.
[d] Integrated light output per unit volume.

TABLE IX

[Solvent and catalyst effects on bis(2,4,5-trichloro-6-carbobutoxyphenyl)oxalate [TCCPO] chemiluminescence [a]]

| Exp. No. | TCCPO (M) | H$_2$O$_2$ (M) | TBAS (10$^4$ M) | NaSal (10$^4$ M) | DMP (percent vol.) | DBP (percent vol.) | 3M3P (percent vol.) | Intensity (ft. lamberts cm.$^{-1}$) as a function of time | | | | | | Lf. Tm.[b] (t$_{3/4}$ (mins.) | Quantum yield [c] (10$^2$ eins. mole$^{-1}$) | Light capacity [d] (lum. hrs. liter$^{-1}$) |
|---|---|---|---|---|---|---|---|---|---|---|---|---|---|---|---|---|
| | | | | | | | | 2 min. | 10 min. | 30 min. | 60 min. | 120 min. | 180 min. | | | |
| 1 | 0.07 | 0.375 | 1.25 | | | 75 | 25 | 27.8 | 24.9 | 19.0 | 14.6 | 4.9 | 1.3 | 82.9 | 15.18 | 328.7 |
| 2 | 0.10 | 0.250 | 1.25 | | | 75 | 25 | 27.6 | 20.0 | 14.5 | 12.2 | 7.9 | 4.0 | 140.6 | 12.22 | 377.9 |
| 3 | 0.10 | 0.375 | 1.75 | | | 75 | 25 | 39.9 | 23.0 | 16.5 | 13.3 | 6.0 | 2.1 | 96.1 | 10.99 | 340.0 |
| 4 | 0.08 | 0.375 | | 2.5 | | 75 | 25 | 0.2 | 1.1 | 2.3 | 2.3 | 2.0 | 1.6 | 448.1 | 5.80 | 143.0 |
| 5 | 0.08 | 0.375 | | 5.0 | | 75 | 25 | 12.1 | 9.0 | 5.9 | 4.3 | 2.9 | 2.2 | 290.0 | 8.34 | 206.8 |
| 6 | 0.08 | 0.375 | | 25.0 | | 75 | 25 | 63.9 | 36.8 | 4.3 | | | | 15.2 | 6.50 | 160.8 |
| 7 | 0.10 | 0.375 | | 2.5 | | 75 | 25 | 0.3 | 1.7 | 2.9 | 3.0 | 2.3 | 1.9 | 471.0 | 5.66 | 174.9 |
| 8 | 0.10 | 0.375 | | 25.0 | | 75 | 25 | 82.8 | 42.3 | 0.5 | | | | 10.4 | 5.11 | 158.0 |
| 9 | 0.08 | 0.375 | 1.25 | | 75 | | 25 | 45.0 | 27.0 | 18.5 | 14.8 | 5.2 | 1.2 | 82.0 | 10.70 | 250.3 |
| 10 | 0.10 | 0.250 | 1.25 | | 75 | | 25 | 51.3 | 29.7 | 20.4 | 15.1 | 6.1 | 2.4 | 93.8 | 12.84 | 381.3 |
| 11 | 0.10 | 0.375 | 1.25 | | 75 | | 25 | 42.5 | 29.0 | 17.7 | 14.8 | 7.6 | 3.1 | 105.8 | 13.20 | 392.1 |
| 12 | 0.10 | 0.375 | 1.75 | | 75 | | 25 | 55.0 | 25.8 | 18.6 | 15.3 | 6.8 | 1.5 | 83.8 | 11.65 | 346.2 |

[a] Experiments at 25° C. with 2.25×10$^{-3}$ M 9,10-bis(phenylethynyl)anthracene (BPEA). TBAS is tetrabutylammonium salicylate; NaSal is sodium salicylate; DMP is dimethyl phthalate; DBP is dibutyl phthalate; 3M3P is 3-methyl-3-pentanol.
[b] Time required for the emission of 75% of the total light.
[c] Quantum yield based on the initial TCCPO concentration.
[d] Integrated light output per unit volume.

TABLE X

[TCCPO chemiluminescence in several solvents [a]]

| Solvent | Light capacity (lum. hr. liter$^{-1}$) | Quantum yield (10$^2$ ein. mole$^{-1}$) | Lf. Tm.[b] t$_{3/4}$ (min.) | Intensity (ft. lbts. cm.$^{-1}$) vs. time | | | | | | |
|---|---|---|---|---|---|---|---|---|---|---|
| | | | | 30 sec. | 2 min. | 10 min. | 30 min. | 60 min. | 90 min. | 120 min. |
| Dibutyl phthalate | 366.6 | 12.01 | 60.3 | 131.7 | 80.5 | 40.1 | 20 | 11.2 | 6.6 | |
| Ethyl benzoate | 325.4 | 10.66 | 141.8 | 7.3 | 15.4 | 12.6 | 12.7 | 11.9 | 9.7 | 7.3 |
| Butyrolactone | 125.4 | 4.11 | 50.9 | 9.5 | 16.1 | 16.8 | 9.2 | 3.9 | 1.7 | 0.6 |
| Butyl butyrate | 237.5 | 7.78 | 98.2 | 1.5 | 4.4 | 8.9 | 13.9 | 12.2 | 8.5 | 4.7 |

[a] Reactions of 0.10 M bis(2,4,5-trichloro-6-carbobutoxyphenyl)oxalate (TCCPO), 0.00023 M 9,10-bis(phenylethynyl)anthracene (BPEA), 0.375 M H$_2$O$_2$, and 1.25×10$^{-4}$ M tetrabutylammonium salicylate (TBAS) in a solution containing 75% of the indicated solvent and 25% 3-methyl-3-pentanol.
[b] Time required for three-quarters total light emission.

TABLE XI

[Chemiluminescence of TCCPO systems in dibutyl phthalate (75%) and 3-methyl-3-pentanol (25%[b])]

| Exp. No. | TCCPO (M) | BPEA (10³ M) | TBAS (10⁴ M) | Intensity (ft. lbts. cm⁻¹) as a function of time | | | | | | | Lf. Tm.[b] $t_{3/4}$ (min.) | Quantum yield [c] (10² ein. mole⁻¹) | Light capacity [d] (lum. hrs-liter⁻¹) |
|---|---|---|---|---|---|---|---|---|---|---|---|---|---|
| | | | | 2 min. | 5 min. | 10 min. | 30 min. | 60 min. | 120 min. | 180 min. | | | |
| 1 | 0.075 | 2.1 | 5.00 | 44.1 | 37 | 33 | 19 | 3.6 | | | 32 | 9.5 | 212 |
| 2 | [e]0.10 | 2.8 | 0.625 | 50 | 60 | 46 | 21 | 11 | 4.4 | 2.4 | 88 | 13.2 | 392 |
| 3 | [e]0.10 | 2.8 | 1.25 | 96 | 77 | 52 | 21 | 11 | 4.0 | 1.2 | 57 | 13.3 | 396 |
| 4 | 0.10 | 2.8 | 1.25 | 48.3 | 34 | 26 | 18 | 15 | 8.0 | 4.0 | 126 | 15.2 | 452 |
| 5 | 0.10 | 2.8 | 2.50 | 51 | 39 | 32 | 25 | 15 | 3.4 | 0.6 | 63 | 12.1 | 361 |
| 6 | 0.10 | 2.8 | 5.00 | 52 | 43 | 38 | 27 | 8.5 | | | 39 | 10.0 | 297 |
| 7 | 0.10 | 2.8 | 10.00 | 62 | 56 | 49 | 14 | 0.6 | | | 21 | 7.4 | 221 |
| 8 | 0.10 | 2.8 | 15.00 | 60 | 51 | 41 | 4.9 | | | | 16 | 5.4 | 161 |

[a] Experiments with 0.25 M H₂O₂ at 25° C. TCCPO is bis(2,4,5-trichloro-6-carbobutoxyphenyl)oxalate; BPEA is 9,10-bis(phenylethynyl)anthracene; TBAS is tetrabutylammonium salicylate.
[b] Time required for the emission of 75% of the total light.
[c] Quantum yield based on the initial TCCPO concentration.
[d] Integrated light output per unit volume.
[e] TCCPO from a different preparation was used in these experiments.

TABLE XII

[The effect of tetrabutylammonium 3,5,6-trichlorosalicylate (TBATCS) on the TCCPO chemiluminescent system [a]]

| Catalyst | Catalyst conc. (10⁴ M) | Intensity (ft. lbts. cm.⁻¹) vs. time | | | | | | Lf. Tm.[b] $t_{3/4}$ (mins.) | Quantum yield [c] (10² ein. mole⁻¹) | Light capacity [d] (lum. hrs. liter⁻¹) |
|---|---|---|---|---|---|---|---|---|---|---|
| | | 2 min. | 10 min. | 30 min. | 60 min. | 120 min. | 180 min. | | | |
| TBAS | 0.25 | 54.5 | 29.8 | 13.7 | 7.7 | 3.7 | 2.1 | 113.0 | 10.44 | 310.3 |
| TBATCS | 0.25 | 66.4 | 33.9 | 13.8 | 7.1 | 3.3 | | 81.0 | 9.74 | 297.3 |
| TBATCS | 1.00 | 99.3 | 42.1 | 16.5 | 7.6 | 1.8 | | 39.2 | 9.93 | 303.2 |
| TBATCS[e] | 1.00 | 0.6 | 6.0 | 14.8 | 10.8 | 5.5 | 3.4 | 190.0 | 10.18 | 310.7 |
| TBAS | 2.50 | 93.9 | 45.1 | 18.9 | 5.1 | | | 29.0 | 9.29 | 275.0 |
| TBATCS | 2.50 | 107.0 | 43.6 | 17.7 | 4.5 | | | 27.1 | 9.29 | 283.6 |

[a] Experiments were run at 25° C. and contained 0.1 M bis(2,4,5-trichloro-6-carbobutoxyphenyl)oxalate (TCCPO), 2.25×10⁻³ M 9,10-bis(phenylethynyl) anthracene and 0.375 M hydrogen peroxide together with the TABTCS or tetrabutylammonium salicylate (TBAS) concentration noted in 75% dibutyl phthalate—25% 3-methyl-3-pentanol solvent mixture.
[b] Time required for the emission of 75% of the total light.
[c] Quantum yield based on the initial TCCPO concentration.
[d] Integrated light output per unit volume.
[e] This experiment also contained 1×10⁻³ M 3,5,6-trichlorosalicylic acid.

TABLE XIII

[Chemiluminescence of TCCPO systems in dibutyl phthalate [a]]

| TCCPO (M) | BPEA (10³ M) | H₂O₂ (M) | TBAS (10⁴ M) | Sal acid (10⁴ M) | Intensity (ft. lbts. cm.⁻¹) as a function of time | | | | | | Lf. Tm.[b] $t_{3/4}$ (min.) | Quantum yield [c] (10² ein. mole⁻¹) | Light capacity [d] (lum. hrs. liter⁻¹) |
|---|---|---|---|---|---|---|---|---|---|---|---|---|---|
| | | | | | 2 min. | 5 min. | 10 min. | 30 min. | 60 min. | 180 min. | | | |
| 0.0333 | 2.1 | 0.070 | 3.00 | 3.00 | 29 | 23 | 21 | 13 | 3.4 | | 35 | 14.8 | 146 |
| 0.0463 | 2.92 | 0.177 | 3.00 | 3.00 | 35 | 31 | 28 | 18 | 5.3 | | 39 | 14.6 | 201 |
| 0.0463 | 2.92 | 0.177 | 5.00 | 0 | 42 | 35 | 32 | 13 | 0.4 | | 23 | 11.4 | 157 |
| 0.0463 | 2.92 | 0.177 | 5.00 | 5.00 | 42 | 31 | 28 | 17 | 2.6 | | 31 | 13.3 | 183 |
| 0.0463[e] | 2.92 | 0.177 | 5.00 | 5.00 | 22 | 15 | 8.8 | 5.5 | 1.6 | 1.0 | 387 | 10.3 | 141 |
| 0.0463 | 2.92 | 0.070 | 5.00 | 5.00 | 39 | 32 | 29 | 15 | | | These experiments were run for 10–30 min. only to investigate the catalyst effect upon initial intensities. | | |
| 0.0463 | 2.92 | 0.070 | 7.50 | 5.00 | 51 | 35 | 29 | | | | | | |
| 0.0463 | 2.92 | 0.070 | 10.0 | 5.00 | 45 | 35 | 31 | 12 | | | | | |
| 0.050 | 3.15 | 0.070 | 3.00 | 3.00 | 30 | 26 | 25 | 19 | 6.7 | | 43 | 14.1 | 212 |

[a] Experiments at 25° C. TCCPO is bis(2,4,5-trichloro-6-carbobutoxyphenyl)oxalate; BPEA is 9,10-bis(phenylethynyl)anthracene; TBAS is tetrabutylammonium salicylate; sal acid is salicylic acid.
[b] Time required for the emission of 75% of the total light.
[c] Quantum yield based on the initial TCCPO concentration.
[d] Integrated light output per unit volume.
[e] Experiment at 0° C.

TABLE XIV

[Chemiluminescence of TCCPO systems in ethyl benzoate (75%) and 3-methyl-3-pentanol (25%)[a]]

| (TCCPO) (M) | BPEA (10³ M) | H₂O₂ (M) | TBAS (10⁴ M) | Sal acid (10³ M) | Intensity (ft. lbts. cm⁻¹) as a function of time | | | | | | Lf. Tm.[b] $t_{3/4}$ (min) | Quantum yield [c] (10² ein. mole⁻¹) | Light capacity [d] (lum. hrs. liter⁻¹) |
|---|---|---|---|---|---|---|---|---|---|---|---|---|---|
| | | | | | 2 min. | 5 min. | 10 min. | 30 min. | 60 min. | 120 min. | 180 min. | | |
| 0.10 | 3.0 | 0.25 | 2.50 | 0 | 25.5 | 21.6 | 19.3 | 17.5 | 14.0 | 4.2 | 1.0 | 80.6 | 9.68 | 287.6 |
| 0.10 | 3.0 | 0.25 | 5.00 | 0 | 32.2 | 31.2 | 29.4 | 21.8 | 7.5 | | | 41.7 | 7.87 | 233.7 |
| 0.10 | 3.0 | 0.25 | 5.00 | 0 | 33.1 | 32.2 | 31.0 | 21.4 | 7.1 | | | 41.2 | 7.89 | 234.4 |
| 0.10 | 3.0 | 0.25 | 10.0 | 0 | 39.1 | 38.1 | 34.9 | 14.5 | 0.6 | | | 23.8 | 5.87 | 174.5 |
| 0.10 | 3.0 | 0.25 | 15.0 | 0 | 40.7 | 37.2 | 33.1 | 9.0 | <0.1 | | | 19.3 | 4.85 | 144.0 |
| 0.10 | 3.0 | 0.25 | 15.0 | 5.00 | 38.9 | 35.9 | 32.2 | 7.7 | | | | 19.0 | 4.65 | 138.2 |
| 0.10 | 3.0 | 0.25 | [e]25.0 | 0 | 74.1 | 62.2 | 40.3 | <1.0 | | | | 9.9 | 5.14 | 152.7 |
| 0.10 | 3.0 | 0.25 | [e]25.0 | 2.50 | 87.4 | 69.0 | 41.8 | <1.0 | | | | 9.1 | 5.60 | 166.3 |
| 0.188 | 3.0 | 0.625 | 10.0 | 0 | 46.6 | 32.7 | 23.7 | 14.0 | 9.7 | 4.3 | | 92.7 | 5.10 | 284.4 |

[a] Experiments at 25° C. TCCPO is bis(2,4,5-trichloro-6-carbobutoxyphenyl)oxalate; BPEA is 9,10-bis(phenylethynyl)anthracene; TBAS is tetrabutylammonium salicylate; sal acid is salicylic acid.
[b] Time required for the emission of 75% of the total light.
[c] Quantum yield based on the initial TCCPO concentration.
[d] Integrated light output per unit volume.
[e] Sodium salicylate was used instead of TBAS.

TABLE XV

[Sodium salicylate catalyzed bis(2,4,5-trichloro-6-carbobutoxyphenyl)oxalate (TCCPO) chemiluminescence in dichlorobenzene [a]]

| TCCPO (M×10$^2$) | NaSal (M×10$^4$) | H$_2$O$_2$ (M×10$^2$) | I$_{max}$ (ft. lbts. cm.$^{-1}$) | t¾A[b] (min.) | Q.Y.[c] (×10$^2$) | Light capacity[d] |
|---|---|---|---|---|---|---|
| 0.1 | 0.83 | 0.20 | 1.0 | 42.8 | 10.05 | 3.0 |
| 1.0 | 3.75 | 2.5 | 27.7 | 8.9 | 6.51 | 19.4 |
| 1.0 | 8.33 | 2.0 | 47.8 | 6.7 | 5.80 | 17.2 |
| 3.0 | 12.5 | 6.25 | 50.5 | 14.1 | 6.59 | 58.7 |
| 3.0 | 12.5 | 8.33 | 64.8 | 12.0 | 6.84 | 60.9 |
| 10.0 | 37.5 | 18.7 | 73.7 | 36.1 | 3.18 | 94.4 |

[a] Reactions with 2×10$^{-3}$ M 9,10-bis(phenylethynyl)anthracene (BPEA) in 75% o-dichlorobenzene and 25% 3-methyl-3-pentanol at 24° C.
[b] Time required for three-quarters of light emission.
[c] Quantum yield in 10$^2$ ein. mole$^{-1}$.
[d] Lumen-hours liter$^{-1}$.

and 3-methyl-3-pentanol solvent. Table XIV shows the results.

EXAMPLE XIII

This example shows the use of sodium salicylate for TCCPO chemiluminescence in a dichlorobenzene solvent. The results are shown in Table XV.

EXAMPLE XIV

In this example, TBAS was used as the catalyst for a TCCPO chemiluminescent reaction in dichlorobenzene as the solvent. The results are illustrated in Table XVI. The effect of varying the concentration of the fluorescer is shown.

TABLE XVI

[The effect of 9,10-bis(phenylethynyl)anthracene (BPEA) on TBAS catalyzed TCCPO chemiluminescence [a] in dichlorobenzene]

| Exp. No. | BPEA (M×10$^3$) | I$_{max}$ (ft. lbts.) | I$_{t=5}$ (ft. lbts.) | I$_{t=50}$ (ft. lbts.) | t$_{1/4}$I (min.) | t$_{3/4}$A (min.) | Quantum yield (×10$^2$) | Light capacity |
|---|---|---|---|---|---|---|---|---|
| 1 | 5.0 | 117.3 | 23.9 | 0.62 | 2.4 | 21.9 | 3.20 | 98.9 |
| 2 | 4.0 | 108.6 | 23.4 | 0.63 | 2.9 | 22.0 | 3.15 | 96.2 |
| 3 | 3.0 | 96.6 | 23.2 | 0.36 | 4.4 | 19.1 | 2.79 | 84.0 |
| 4 | 2.0 | 68.0 | 16.6 | 0.56 | 4.8 | 19.3 | 1.94 | 57.6 |
| 6 | 1.0 | 35.5 | 7.9 | 0.22 | 4.2 | 14.8 | 0.82 | 23.7 |

[a] Reactions of 0.10 M bis(2,4,5-trichloro-6-carbobutoxyphenyl)oxalate (TCCPO), 0.002 M tetrabutylammonium salicylate (TABAS) and 0.20 M H$_2$O$_2$ in 50% o-dichlorobenzene–25% Freon 214–25% 3-methyl-3-pentanol at 25° C.

EXAMPLE XI

The present example illustrates the effects of tetrabutylammonium salicylate (TBAS) and salicylic acid (sal acid) on TCCPO chemiluminescence in a dibutyl phthalate solvent. The results are shown in Table XIII. Salicylic acid is seen to have relatively little effect on brightness.

EXAMPLE XII

In this example, the performance of the TCCPO chemiluminescent reaction is shown in a mixed ethyl benzoate

EXAMPLE XV

This example shows the effect of varying the concentration of a TBAS catalyst on the TCCPO reaction in a dichlorobenzene solvent. The results are shown in Table XVII.

EXAMPLE XVI

The effect of temperature on the TCCPO chemiluminescent reaction is compared in this example. The results are shown in Table XVIII.

TABLE XVII

[The effect of tetrabutylammonium salicylate (TBAS) on TCCPO chemiluminescence [a] in dichlorobenzene]

| TBAS (M×10$^3$) | I$_{max}$ (ft. lbts.) | I$_{t=5}$ (ft. lbts.) | I$_{t=50}$ (ft. lbts.) | t$_{1/4}$I (min.) | t$_{3/4}$A (min.) | Quantum yield (×10$^2$) | Light capacity |
|---|---|---|---|---|---|---|---|
| 1.0 | 90.3 | 18.4 | 2.06 | 2.9 | 26.3 | 2.66 | 78.9 |
| 2.0 | 77.0 | 18.7 | 0.30 | 4.7 | 17.6 | 2.07 | 61.4 |
| 2.5 | 73.3 | 19.4 | 0.16 | 5.6 | 14.6 | 1.92 | 57.1 |
| 3.0 | 66.9 | 17.6 | 0.08 | 5.5 | 13.4 | 1.66 | 49.4 |
| 4.0 | 62.7 | 17.6 | 0.04 | 6.0 | 9.3 | 1.33 | 39.5 |

[a] Reaction of 0.10 M bis(2,4,5-trichloro-6-carbobutoxyphenyl)oxalate (TCCPO), 0.002 M 9,10-bis(phenylethynyl)anthracene (BPEA), and 0.20 M hydrogen peroxide in 50% o-dichlorobenzene–25% Freon 214–25% 3-methyl-3-pentanol at 25° C.

TABLE XVIII

[Effect of temperature on TCCPO chemiluminescence [a]]

| Temperature (° C.) | Lf. time[b] (1 min.) | Quantum yield (10$^2$ ein. mole$^{-1}$) | Light capacity (lumen hours liter$^{-1}$) | Intensity (foot lamberts cm.$^{-1}$) versus time | | | | |
|---|---|---|---|---|---|---|---|---|
| | | | | 2 min. | 5 min. | 10 min. | 30 min. | 60 min. |
| 40 | 3.6 | 3.55 | 108 | 154 | 38 | 6 | | |
| 25 | 19 | 5.48 | 167 | 82 | 53 | 35 | 1.2 | |
| 13 | 87 | 4.71 | 144 | 28 | 22 | 14 | 8.1 | 4.7 |
| 0 | 162 | 3.59 | 110 | 18 | 13 | 9.0 | 5.1 | 2.7 |
| −10 | 169 | 2.28 | 70 | 13 | 8.4 | 5.5 | 2.5 | 1.6 |
| −21.5 | 585 | 2.50 | 96 | 7.5 | 3.6 | 2.8 | 1.5 | 1.1 |

[a] Reactions of 0.1 M bis(2,4,5-trichloro-6-carbobutoxyphenyl)oxalate (TCCPO), 0.0022 M 9,10-bis(phenylethynyl)anthracene (BPEA), 0.375 M H$_2$O$_2$, and 0.00375 M sodium salicylate in 75% ethyl benzoate–25% 3-methyl-3-pentanol solution.
[b] Time required for three-quarters of light emission.

EXAMPLE XVII

In this example, the storage stabilities of TCCPO and BPEA in dibutyl phthalate and in ethyl benzoate at 75° C. in a Teflon container are determined for up to 60 days. This represents an accelerated life test of normal storage for more than two years. The results are shown in Table XIX.

in the presence of sodium salicylate (NaSal) or tetrabutylammonium salicylate catalysts are summarized in Table XX and XXI. These components were found to have adequate storage stabilities for use in two component chemical lighting systems.

TABLE XIX

[Storage stability of TCCPO components in dibutyl phthalate and in ethyl benzoate stored in Teflon FEP at 75° C. (167° F.)]

| Exp. No. | Oxalate component [a] | Storage time (days) | Q. Y.[b] ($10^2$ ein. mole$^{-1}$) | Lt. cap. (lm. hr. liter$^{-1}$) | Lifetime[c] $t_{3/4}$ (min.) | Intensity (ft. lbts. cm.$^{-1}$) vs. time | | | | | |
|---|---|---|---|---|---|---|---|---|---|---|---|
| | | | | | | 1 min. | 5 min. | 10 min. | 20 min. | 30 min. | 60 min. |
| 1 | A[d] | 0 | 12.8 | 177 | 31 | 62 | 26 | 25 | 24 | 20 | 1.9 |
| | | 30 | 12.8 | 177 | 20.3 | 103 | 39 | 32 | 25 | 13 | 0.1 |
| | | 60 | 9.0 | 124 | 14.2 | 62 | 40 | 33 | 14 | 3.3 | |
| 2 | B[d] | 1 | 11.6 | 161 | 22 | 62 | 34 | 33 | 25 | 13 | 0.32 |
| | | 30 | 10.0 | 138 | 18.7 | 70 | 34 | 28 | 19 | 9.3 | |
| | | 60 | 4.8 | 66.4 | 10.2 | 50 | 26 | 13 | 3.2 | 0.3 | |
| 3 | C[e] | 0 | 5.03 | 155.6 | 9.7 | 85 | 74 | 40 | 7.4 | 1.0 | |
| | | 30 | 5.27 | 163.0 | 9.4 | 100 | 72 | 53 | 28 | | |
| | | 60 | 3.88 | 120.1 | 5.0 | 138 | 85 | 4.8 | | | |
| | | 30 | 1.17 | 36.3 | 6.7 | 23 | 16 | 6.4 | 0.72 | | |

[a] Component A contained 0.0555 M bis(2,4,5-trichloro-6-carbobutoxyphenyl)oxalate (TCCPO) and 3.5×10$^{-3}$ M 9,10-bis(phenylethynyl)anthracene (BPEA) in dibutyl phthalate; component B was identical except that it contained 1.6% (wt./vol.) CaCO$_3$. Component C contained 0.133 M TCCPO and 4×10$^{-3}$ M BPEA in ethyl benzoate.
[b] Quantum yield based on TCCPO.
[c] Time required for emission of three quarters of the total light.
[d] Five parts by volume of the stored oxalate component was mixed with 1 part of a freshly prepared peroxide component containing 0.700 M H$_2$O$_2$, 3.0×10$^{-3}$ M tetrabutylammonium salicylate (TBAS), and 3.0×10$^{-3}$ M salicylic acid in dibutyl phthalate in chemiluminescence tests.
[e] Three parts of the oxalate component was combined with one part of a freshly prepared peroxide component containing 1.0 M H$_2$O$_2$ and 0.01 M sodium salicylate in 3-methyl-3-pentanol in chemiluminescence tests.

EXAMPLE XVIII

The storage stabilities of hydrogen peroxide solutions in 3-methyl-3-pentanol in the absence of a catalyst and

EXAMPLE XIX

In this example, the storage stability of TCCPO with BPEA in a dibutyl phthalate solvent at 50° C. in a Teflon container is illustrated. The results are tabulated in Table XXII.

TABLE XX

[Storage stability of H$_2$O$_2$-NaSal-3-methyl-3-pentanol components at 75° C. in Teflon FEPR [a]]

| Component | NaSal[b] ($10^4$ M) | Storage time (days) | Intensity (ft. lambert cm.$^{-1}$) versus time | | | | | | | | Lf. Tm.[c] $t_{3/4}$ (mins.) | Quantum yield[d] ($10^2$ ein. mole$^{-1}$) | Lt. cap.[e] (lum. hrs. liter$^{-1}$) |
|---|---|---|---|---|---|---|---|---|---|---|---|---|---|
| | | | 2 min. | 10 min. | 30 min. | 60 min. | 120 min. | 180 min. | 240 min. | 360 min. | | | |
| 1 | None | 0 | 28.5 | 20.8 | 12.1 | 7.9 | 4.3 | 2.7 | 1.7 | 0.7 | 155.2 | 9.57 | 284.2 |
| | None | 30 | 15.1 | 12.2 | 7.5 | 5.0 | 3.0 | 2.0 | 1.6 | 1.1 | 302.3 | 7.86 | 240.0 |
| 2 | .25 | 0 | 54.5 | 29.8 | 13.7 | 7.7 | 3.7 | 2.1 | 1.3 | 0.6 | 113.0 | 10.44 | 310.3 |
| | .25 | 30 | 33.4 | 19.0 | 11.4 | 6.9 | 3.6 | 2.3 | 1.4 | 0.7 | 147.3 | 8.80 | 268.5 |
| 3 | .625 | 0 | 62.2 | 32.5 | 15.4 | 7.9 | 3.6 | 1.9 | 1.1 | | 90.5 | 10.38 | 308.3 |
| | .625 | 30 | 35.4 | 20.4 | 12.2 | 7.4 | 3.8 | 2.4 | 1.7 | | 138.8 | 8.71 | 265.7 |
| 4 | 1.25 | 0 | 75.6 | 38.1 | 16.3 | 9.2 | 2.9 | 0.4 | | | 54.6 | 10.29 | 305.7 |
| | 1.25 | 30 | 46.6 | 25.1 | 12.3 | 7.2 | 3.7 | 2.3 | 1.3 | | 111.6 | 9.36 | 285.7 |

[a] Stored solutions contained: 1. 1.5 M Hydrogen Peroxide (H$_2$O$_2$) and zero sodium salicylate (NaSal) in 3-methyl-3-pentanol (3M3P); 2. 1.5 M H$_2$O$_2$ and 1×10$^{-4}$ M NaSal in 3M3P; 3. 1.5 M H$_2$O$_2$ and 2.5×10$^{-4}$ M NaSal in 3M3P; 4. 1.5 M H$_2$O$_2$ and 4.0×10$^{-4}$ M NaSal in 3M3P. Each solution in "pilot plant distilled" 3-methyl-3-pentanol (3M3P) stored at 75° C. in Teflon containers. Chemiluminescence assay experiments were run at 25° C., and contained 0.1 M bis(2,4,5-trichloro-6-carbobutoxyphenyl)-oxalate (TCCPO), 2.25×10$^{-3}$ M 9,10-bis(phenylethynyl)anthracene, and 0.375 M H$_2$O$_2$ together with the NaSal concentration noted in the table. Solvent consisted of 75% dibutyl phthalate and 25% 3M3P.
[b] Catalyst concentration in total system.
[c] Time required for the emission of 75% of the total light.
[d] Quantum yield based on the initial TCCPO concentration.
[e] Integrated light output per unit volume.

TABLE XXI

[Storage stability of H$_2$O$_2$-TBAS components at 50° C [a].]

| Storage time (days) | Intensity (ft. lbt. cm.$^{-1}$) vs. time | | | | | Lf. Tm.[b] $T_{3/4}$ (mins.) | Q. Y.[c] ($10^2$ ein. mole$^{-1}$) | Lt. cap.[d] (lum hrs. liter$^{-1}$) |
|---|---|---|---|---|---|---|---|---|
| | 2 min. | 10 min. | 30 min. | 60 min. | 120 min. | | | |
| 0 | 91.8 | 45.1 | 18.1 | 9.2 | 3.1 | 53.5 | 12.18 | 361.9 |
| 30 | 86.7 | 44.5 | 21.4 | 9.2 | 2.7 | 51.7 | 12.00 | 357.0 |
| 60 | 61.0 | 33.9 | 14.9 | 7.9 | 3.5 | 87.6 | 10.25 | 304.7 |
| 90 | 20.4 | 17.4 | 10.6 | 6.8 | 3.5 | 171.7 | 8.44 | 257.7 |

[a] Stored solution contained: 1.5 M hydrogen peroxide (H$_2$O$_2$) and 5×10$^{-4}$ M tetrabutylammonium salicylate (TBAS) in pilot-plant distilled 3-methyl-3-pentanol. Chemiluminescence assay experiments were run at 25° C, and contained 0.1 M bis(2,4,5,trichloro-6-carbobutoxyphenyl)oxalate, 2.25×10$^{-3}$ M 9,10-bis(phenylethynyl) anthracene, 0.375 M H$_2$O$_2$ and 1.25×10$^{-4}$ M TBAS, in 75% Eastman White Label dibutyl phthalate (DBP)–25% 3-methyl-3-pentanol solvent mixture.
[b] Time required for the emission of 75% of the total light.
[c] Quantum yield based on the initial TCCPO concentration.
[d] Integrated light output per unit volume.

TABLE XXII

[Storage stability of 0.11 M TCCPO and 0.004 M BPEA in dibutyl phthalate at 50° C. in Teflon FEP [a]]

| Storage time (days) | Q.Y.[b] (10² ein. mole⁻¹) | Lt. cap. (lum. hr. liter⁻¹) | Lf. Tm.[c] t₃/₄ (mins.) | Intensity (ft. lbts. cm.⁻¹) vs. time |||||||
|---|---|---|---|---|---|---|---|---|---|---|
| | | | | 1 min. | 5 min. | 10 min. | 20 min. | 30 min. | 60 min. | 120 min. |
| 0 | 10.12 | 300 | 41 | 92 | 44 | 37 | 32 | 26 | 9.9 | |
| 37 | 8.82 | 269 | 44 | 54 | 36 | 31 | 28 | 25 | 11.0 | |
| 64 | 9.98 | 296 | 37 | 62 | 42 | 37 | 31 | 26 | 9.4 | |
| 96 | 8.45 | 254 | 33 | 60 | 46 | 41 | 33 | 26 | 5.2 | |

[a] Commercially available (Eastman) dibutyl phthalate was used. Nine parts of the stored component was reacted with one part of a peroxide component comprising 2.5 M $H_2O_2$ and tetrabutyl ammonium salicylate (0.005 M) in laboratory distilled tertiary butanol in the chemiluminescence assey experiments.
[b] Quantum yield based on TCCPO.
[c] Time required for three-quarters of total light emission.

EXAMPLE XX

A solution of 0.111 M TCCPO and 0.0031 M BPEA in dibutyl phthalate was prepared as one component of a two-component chemiluminescent system. The second component comprised a solution of 2.5 M hydrogen peroxide and 0.005 M TBAS in t-butyl alcohol. The system was activated by combining 9 parts of the first (oxalate) component with one part of the second (peroxide) component. The performance of the system is summarized in Table XXIII. Also indicated in Table XXIII is the performance of the system after storage of the oxalate component in 5-mil Teflon FEP® film for 37 days at 50° C.

TABLE XXIII

[Performance of a two-component TCCPO chemical lighting system]

| Days storage at 50° C. | Quantum yield (10² ein. mole⁻¹) | Light cap. (lum. hr. liter⁻¹) | Intensity (ft. lbts. cm⁻¹) versus operating time ||||
|---|---|---|---|---|---|---|
| | | | 1 min. | 10 min. | 30 min. | 60 min. |
| 0 | 10.1 | 301 | 92 | 37 | 26 | 9.9 |
| 37 | 8.8 | 269 | 54 | 31 | 25 | 11 |

As indicated previously, substituted halo-carbalkoxy derivatives of bis(phenyl) oxalates may be prepared by procedures employing two chlorination methods. Preparation of these compounds is illustrated by the following Examples XXI to XXVII.

EXAMPLE XXI

Preparation of bis(2,4,5-trichloro-6-carbobutoxyphenyl)oxalate (Method 1)

3,5,6-trichlorosalicylic acid [3].—Chlorine gas was passed into a solution of 300 g. (1.45 moles) of 3,5-dichlorosalicylic acid and 37.5 mg. of iodine in 400 ml. of 65% fuming sulfuric acid for 24 hours, while the temperature was maintained at 70° C. The cooled solution was poured into 2 kg. of ice with good mixing, and the colorless solid formed was collected by filtration to obtain 294 g. (84%) of the product, M.P. 206–208° C. (lit⁻¹, M.P. 203–205° C.). Large quantities of product can be recrystallized from aqueous ethanol, but this is probably unnecessary.

Butyl 3,5,6-trichlorosalicylate.—3,5,6-trichlorosalicylic acid (77 g., 0.32 mole) and 50 g. of concentrated sulfuric acid were dissolved in 400 ml. of n-butanol. The reaction mixture was refluxed 20 hours, then diluted with 2 liters of water. The organic phase was separated, taken up in 150 ml. petroleum ether, washed twice with 250 ml. portions of water, filtered to remove starting material, and evaporated to dryness under vacuum for 8 hours to obtain 46.8 g. (49%) of pale yellow crystalline material, M.P. 33.5–35.5° C.

Bis(2,4,5-trichloro - 6 - carbobutoxyphenyl)oxalate.—To a stirred solution of 201 g. (0.67 mole) of butyl 3,5,6-trichlorosalicylate and 68 g. (0.67 mole) of triethylamine in 500 ml. of reagent benzene, a solution of 47 g. (0.37 mole) of oxalyl chloride in 75 ml. of reagent benzene was added dropwise during 30 minutes at 25° C. After completion of addition of oxalyl chloride, the reaction mixture was stirred 3 hours at 25° C., and then filtered to remove triethylamine hydrochloride. The filtrate was evaporated to dryness, and the residue was crystallized three times from cyclohexane to obtain 115 g. (53%) of white crystalline material, M.P. 120–123° C.

Analysis.—Calcd. for $C_{24}H_{20}Cl_6O_8$ (percent): C, 44.40; H, 3.11; Cl, 32.77. Found (percent): C, 44.61; H, 3.21: Cl, 32.60.

EXAMPLE XXII

Bis(3-bromo-2,4,5-trichloro-6-carbobutoxyphenyl)oxalate (Method 1)

4-bromo - 3,5,6 - trichlorosalicylic acid.—The bromotrichloro acid was prepared according to a previously described procedure by bromination of 3,5,6-trichlorosalicylic acid in 60% fuming sulfuric acid [4]. Recrystallization of the crude material from aqueous ethanol gave 68% of colorless solid, M.P. 239–241° C.

Analysis.—Calcd. for $C_7H_2BrCl_3O_3$ (percent): C, 26.21; H, 0.62; Br, 24.96; Cl, 33.23. Found (percent): C, 25.84; H, 0.70; Br, 24.58; Cl, 32.82.

Butyl 4-bromo-3,5,6-trichlorosalicylate.—A solution of 15.8 g. (0.049 mole) of 4-bromo-3,5,6-trichlorosalicylic acid, 9 g. of concentrated sulfuric acid and 80 ml. of n-butyl alcohol was refluxed for 16 hours. The cooled mixture was poured into cold water and extracted with a mixture of benzene and ethyl ether. The insoluble solid (4.0 g.) was collected and identified as starting material. Evaporation of solvent gave 10.1 g. of viscous oil. The oil was quite soluble in hexane and became partially crystalline on trituration. Recrystallization from ethanol gave a colorless solid, M.P. 51–52° C.

Analysis.—Calcd. for $C_{11}H_{10}BrCl_3O_3$ (percent): C, 35.07; H, 2.66; Br, 21.24; Cl, 28.31. Found (percent): C, 35.18; H, 2.51; Br, 21.42; Cl, 28.36.

Bis(3-bromo - 6 - carbobutoxy-2,4,5-trichlorophenyl) oxalate.—To a solution of 5.80 g. (15.4 mmole) of butyl 4-bromo-3,5,6-trichlorosalicylate and 0.98 g. (7.7 mmole) of oxalyl chloride in 75 ml. of anhydrous benzene was added dropwise 1.56 g. (15.4 mmole) of triethylamine. The mixture was stirred at room temperature for 5 hours. The triethylamine hydrochloride was collected, and the filtrate was evaporated to give a thick oil. Dissolving the oil in 100 ml. of hot petroleum ether and cooling gave 280 mg. of colorless solid, M.P. 200–215° C. Recrystallization from benzene yielded an unidentified, colorless solid, M.P. 236–238° C.; infrared, 1765 cm.⁻¹.

Concentration of the petroleum ether filtrate to 35 ml. gave 3.66 g. of colorless solid. Recrystallization from petroleum ether gave crystals, M.P. 102–104° C.; infrared, 1770, 1720 and 1660 cm.⁻¹.

Analysis.—Calc'd for $C_{24}H_{18}Br_2Cl_6O_8$ (perecnt): C, 35.70; H, 2.23; Br, 19.83; Cl, 26.41. Found (percent): C, 35.89; H, 2.34; Br, 20.09; Cl, 26.41.

EXAMPLE XXIII

Bis(2,4-dichloro-3-carbobutoxyphenyl)oxalate (Method 2)

2,6-dichloro - 3 - hydroxybenzoic acid.—The product was prepared according to the procedure of Zincke [5] for ---
[3] D. L. Hann, U.S. Patent No. 3,062,877.
[4] L. H. Farinholt, A. P. Stuart and D. Tuiss, J. Am. Chem. Soc., 62, 1237 (1940).
[5] T. Zincke, Ann. 261, 239 (1891).

the preparation of trichloro 3-hydroxybenzoic acid, and crystallized from benzene to obtain 46 g. (55%) of crystalline material, M.P. 110–115° C.

*Analysis.*—Calc'd for $C_7H_4Cl_2O_3$ (percent): C, 40.61; H, 1.95; Cl, 34.25. Found (percent): C, 40.14; H, 1.95; Cl, 33.30.

Butyl 2,6-dichloro-3-hydroxybenzoate.—A solution of 24.0 g. (0.116 mole) of 2,6-dichloro-3-hydroxybenzoic acid and 5 g. of concentrated sulfuric acid in 125 ml. of n-butanol was refluxed for 20 hours, cooled, and then diluted with 1.5 liters of water. The organic phase was separated, taken up to 100 ml. of petroleum ether, washed twice with 50 ml. portions of water, dried over $CaCl_2$, filtered, evaporated under reduced pressure at 30° C. for 4 hours, and then evaporated under vacuum at 50° C. for 3 hours to obtain 22.1 g. (72%) of pale yellow liquid, whose IR spectrum is in accordance with that expected for the desired product.

Bis(2,4-dichloro-3-carbobutoxyphenyl)oxalate.—To a stirred solution of 22.1 g. (0.084 mole) of butyl 2,6-dichloro-3-hydroxybenzoic acid and 8 g. (0.080 mole) of triethylamine in 150 ml. of reagent benzene at 25° C. under nitrogen atmosphere, oxalyl chloride (5.3 g., 0.042 mole) was slowly added during 5 minutes. The reaction was stirred one hour at 25° C., then filtered. The filtrate was evaporated under reduced pressure at 40° C. for 3 hours to obtain a mixture of yellow crystalline solid and dark brown liquid as residue. The crude crystalline product was separated by filtration and crystallized four times from cyclohexane to obtain 3.1 g. (12.7%) of white crystalline material, M.P. 106–108° C.

*Analysis.*—Calcd. for $C_2H_{22}Cl_4O_8$ (percent): C, 49.68; H, 3.82; Cl, 24.44. Found (percent): C, 49.50, H, 3.80; Cl, 24.00.

EXAMPLE XXIV

Bis(2,4-dichloro-6-carbethoxyphenyl)oxalate
(Method 2)

Ethyl 3,5-dichlorsalicylate - 3,5 - dichlorosalicylic acid (41.4 g., 0.2 mole [Eastman]) was added to a solution of 30 g. of concentrated sulfuric acid in 150 ml. of ethanol, and the mixture was heated four hours at reflux, then cooled. The precipitate from the reaction mixture was collected, washed with cold ethanol, and taken up in 250 ml. of warm petroleum ether. The solution was filtered to remove starting material, then evaporated to dryness to obtain 13.3 g. (28%) of white crystalline material, M.P. 59–62° C.

*Analysis.*—Calcd. for $C_9H_8Cl_2O_3$ (percent): C, 45.98; H, 3.43; Cl, 30.17. Found (percent): C, 46.11; H, 3.39; Cl, 29.76.

Bis(2,4-dichloro-6-carbethoxyphenyl)oxalate.—Ethyl 3,5-dichlorosalicylate (4.25 g., 0.018 mole) and triethylamine (1.8 g., 0.018 mole) were combined in 50 ml. of reagent benzene, and to the stirred solution, under nitrogen, 1.2 g. (0.009 mole) of oxalyl chloride was added slowly. The reaction mixture was stirred one hour at 25° C., and then filtered. The filtrate was evaporated to dryness under reduced pressure, and the residue was crystallized from cyclohexane to obtain 1.5 g. (31%) of white crystalline material, M.P. 144–148° C.

*Analysis.*—Calcd. for $C_{20}H_{14}Cl_4O_8$ (percent): C, 45.83; H, 2.69; Cl, 27.06. Found (percent): C, 45.69; M, 2.78; Cl, 26.76.

EXAMPLE XXV

Bis(3-n-butoxy-2,4,6-trichlorophenyl)oxalate
(Method 2)

3-n-butoxyphenyl.—A 59% yield of product was obtained from resorcinol and n-butyl bromide in alcoholic potassium hydroxide.[6]

3-n-butoxy-2,4,6-trichlorophenol.—Chlorine gas was bubbled into a solution of 8.3 g. (0.05 mole) of 3-n-butoxyphenol in 25 ml. of carbon tetrachloride for one hour. The color of the solution became red-brown and changed to clear yellow at the end of the reaction. The temperature of the reaction solution rose to 40–50° C., then gradually decreased to 30° C. The solvent was removed and the liquid isolated was distilled at 119° C./1 mm. The yield of the light yellow-brown oil, IR, 3520 cm.$^{-1}$, was 6.9 g. or 50%.

*Analysis.*—Calcd. for $C_{10}H_{11}Cl_3O_2$ (percent): C, 44.52; H, 4.08; Cl, 39.53. Found (percent): C, 43.90; H, 4.00; Cl, 40.15.

Bis(3-n-butoxy-2,4,6-trichlorophenyl)oxalate.—Triethylamine (1.51 g., 0.015 mole) was added dropwise to a solution of 4.05 g. (0.015 mole) of 3-n-butoxy-2,4,6-trichlorophenol, 0.94 g. (0.0075 mole) of oxalyl chloride and 40 ml. of benzene. The addition of triethylamine was completed in ten minutes and the mixture was stirred at room temperature for one hour. The triethylamine hydrochloride was removed and the filtrate was evaporated to give a brown oil. Attempted vacuum distillation decomposed the product, but chromatography on silica gel and benzene gave 3.5 g. (40%) of viscous tan oil, IR, 1800 and 1780 cm.$^{-1}$.

*Analysis.*—Calcd. for $C_{22}H_{20}Cl_6O_6$ (percent): C, 44.52; H, 3.37; Cl, 35.92. Found (percent): C, 43.37; H, 3.13; Cl, 36.73.

EXAMPLE XXVI

Bis(2,4,5-trichloro-6-carbopentoxyphenyl)oxalate
(CPPO)

n-Pentyl 3,5,6-trichlorosalicylate.—A solution of 48.3 g. (0.20 mole) of purified 3,5,6-trichlorosalicylic acid, 200 ml. of n-pentyl alcohol and 4 g. of concentrated sulfuric acid was refluxed 24 hours. A Dean-Stark trap was used to remove the water from the reaction solution. The cooled solution was poured into 250 ml. of ice-water and the mixture was stirred for 15 minutes. Hexane (200 ml.) was added and the organic layer was separated and washed with two 50-ml. portions of water, then dried with anhydrous sodium sulfate. Evaporation of solvent gave a dark oil, which was distilled at 128–143° C./0.1 mm. to give 46 g. of brown liquid. Distillation again at 140° C./ 0.1 mm. gave 37.1 g. (59%) of product; infrared, 1735 and 1660 cm.$^{-1}$.

*Analysis.*—Calcd. for $C_{12}H_{13}Cl_3O_3$ (percent): C, 46.23; H, 4.17; Cl, 34.19. Found (percent): C, 46.46; H, 4.42; Cl, 34.25.

Bis(2,4,5-trichloro-6-carbopentoxyphenyl)oxalate.—Triethylamine (10.1 g., 0.10 mole) was added dropwise to a solution of 31.2 g. (0.10 mole) of n-pentyl 3,5,6-trichlorosalicylate and 6.1 g. (0.05 mole) of oxalyl chloride in 350 ml. of anhydrous benzene. The thick mixture was stirred at room temperature for 7 hours and filtered to remove the triethylamine hydrochloride. The solid was washed with 100 ml. of benzene and the filtrate was evaporated at 60° C./50 mm. The remaining oil was dissolved in 100 ml. of hexane and the solution was cooled to give 20.3 g. (60%) of colorless solid, M.P. 76–84° C. Recrystallization from 150 ml. of hexane gave 17.7 g. of product, M.P. 83–86° C.; infrared, 1790 and 1735 cm.$^{-1}$.

*Analysis.*—Calcd. for $C_{26}H_{24}Cl_6O_8$ (percent): C, 46.08; H, 3.55; Cl, 31.46. Found (percent): C, 46.42; H, 3.61; Cl, 31.51.

Evaporation of the 100 ml. of hexane filtrate from the first crystallization of oxalate gave 10.8 g. of unchanged salicylate. Thus the yield of product based on unrecovered salicylate was 90%.

EXAMPLE XXVII

Bis(2,4-dichloro-3,5-dicarbobutoxyphenyl)
oxalate (DCDCPO)

2,6-dichloro-5-hydroxyisophthalic acid (Method 2).—Chlorine gas was bubbled at a steady rate into a stirred ---
[6] E. Klarmann, L. W. Gatyas and V. A. Shternov, J. Am. Chem. Soc., 53, 3397 (1931).

mixture of 73 g. (0.4 mole) of 5-hydroxyisophthalic acid and 500 ml. of glacial acetic acid during 6 hours at 10–15° C. The reaction mixture was then filtered, and the insoluble material was washed with slurrying with 100 ml. of water, and dried under vacuum over $P_2O_5$. Crystallization from ethanol-petroleum ether (1:2) gave 61 g. (61%) of white powder, M.P. 326–328.

*Analysis.*—Calcd. for $C_8H_4Cl_2O_5$ (percent): C, 38.28; H, 1.61; Cl, 28.25. Found (percent): C, 39.49; H, 1.91; Cl, 26.02.

Dibutyl 2,6-dichloro-5-hydroxyisophthalate.—A solution of 29 g. (0.115 mole) of 2,6-dichloro-5-hydroxyisophthalic acid and 5 g. of concentrated sulfuric acid in 200 ml. of n-butanol was refluxed for 20 hours, then diluted with 1.4 liters of water. The mixture was stirred one hour, then the organic phase was separated, dissolved in 150 ml. of petroleum ether, washed with 150 ml. of water, and dried over $CaCl_2$. The petroleum ether solvent was removed under reduced pressure, and the oil obtained was distilled at 215–217° C./0.1 mm. Hg to obtain 30.6 g. (73.2%) of yellow oil.

*Analysis.*—Calcd. for $C_{16}H_{20}Cl_2O_5$ (percent): C, 52.90; H, 5.55; Cl, 19.52. Found (percent): C, 54.16; H, 5.68; Cl, 18.25.

Bis(2,4-dichloro - 3,5 - dicarbobutoxyphenyl)oxalate.—To a stirred solution of 30 g. (0.083 mole) of dibutyl 2,6-dichloro - 5 - hydroxyisophthalate and 5.2 g. (0.041 mole) of oxalyl chloride in 100 ml. of benzene, triethyl amine (8.3 g., 0.083 mole) was added slowly during 5 minutes. The reaction mixture was stirred 2 hours at 25° C., then filtered, and the filtrate was evaporated under reduced pressure at 25–30° C. for 3 hours to obtain a brown solid residue. The crude product was crystallized three times from hexane to obtain 14.4 g. (45%) of white solid, M.P. 101.5–104° C.

*Analysis.*—Calcd. for $C_{34}H_{38}Cl_4O_{12}$ (percent): C, 52.32; H, 4.91; Cl, 18.17. Found (percent): C, 53.32; H, 5.39; Cl, 16.67.

What is claimed is:

1. A composition intended to be reacted with hydrogen peroxide in the presence of an organic solvent, said composition containing the ingredients, a compound of the formula:

where:
X represents electronegative substituents;
Y represents a carbalkoxy group;
Z represents a member selected from the group consisting of hydrogen, alkyl, branched alkyl and alkoxy alkyl,
$m$, $n$ and $q$ are integers such that the combined Hammett sigma constant value of the X, Y and Z substituents on each phenyl group is between about 1.4 and 2.7, each of said $m$ and $n$ being always at least one; and
$p$ is an integer of at least 1, and an organic fluorescent compound, in effective amounts.

2. A composition as in claim 1 wherein said compound is a bis(phenyl)oxalate ester derivative wherein $p$ is one.

3. A composition as in claim 1 wherein said compound is a bis(2,4,5-trichloro-6-carboalkoxyphenyl)oxalate.

4. A composition as in claim 1 including, additionally, a basic catalyst.

5. A composition as in claim 3 wherein said compound is selected from the group consisting of bis(2,4,5-trichloro-6-carbobutoxyphenyl)oxalate and bis(2,4,5-trichloro-6-carbopentoxyphenyl)oxalate.

6. The composition of claim 1 consisting essentially of said oxalate and fluorescer in the solid state.

7. The composition of claim 1 comprising, additionally, an organic solvent.

8. A composition as in claim 7 wherein said solvent comprises a major proportion of a solvent selected from the group consisting of esters, aromatic hydrocarbons and chlorinated hydrocarbons.

9. The composition of claim 8 wherein said solvent is a dialkylphthalate, said alkyl groups having from 1 to about 12 carbon atoms.

10. A composition as in claim 1 wherein said fluorescer is selected from the group consisting of 9,10-bis(phenylethynyl)anthracene; 1 - methoxy-9,10-bis(phenylethynyl)anthracene; 9,10-diphenylanthracene.

References Cited
UNITED STATES PATENTS
3,425,949   2/1969   Rauhut et al. ______ 252—188.3

JOHN D. WELSH, Primary Examiner

U.S. Cl. X.R.
260—2.25, 484

UNITED STATES PATENT AND TRADEMARK OFFICE
CERTIFICATE OF CORRECTION

PATENT NO. : 3,749,679

DATED : July 31, 1973

INVENTOR(S) : Michael McKay Rauhut

It is certified that error appears in the above-identified patent and that said Letters Patent is hereby corrected as shown below:

In Column 1, insert the following statement as the second paragraph of the Specification:

--The invention herein described was made in the course of or under a contract (Contract No. N60921-67-C-0214) or subcontract thereunder, (or grant) with the Department of the Navy.--

Signed and Sealed this

Twenty-eighth Day of August, 1990

Attest:

HARRY F. MANBECK, JR.

*Attesting Officer*  *Commissioner of Patents and Trademarks*